US006459830B1

(12) United States Patent
Pua et al.

(10) Patent No.: US 6,459,830 B1
(45) Date of Patent: Oct. 1, 2002

(54) METHOD AND APPARATUS TO COMPENSATE FOR POLARIZATION MODE DISPERSION

(75) Inventors: Hok Yong Pua, Plano, TX (US); Chris Allen, Independence, MO (US); Ken Demarest, Lawrence; Ron Hui, Lenexa, both of KS (US); Kumar Vijay Peddanarappagari, Plano, TX (US)

(73) Assignee: Sprint Communications Company L.P., Oakland Park, KS (US)

( * ) Notice: Subject to any disclaimer, the term of this patent is extended or adjusted under 35 U.S.C. 154(b) by 0 days.

(21) Appl. No.: 09/500,092

(22) Filed: Feb. 8, 2000

(51) Int. Cl.$^7$ .................................................. G02B 6/28
(52) U.S. Cl. ........................... 385/24; 385/11; 359/156; 359/161; 359/192
(58) Field of Search .............................. 385/11, 24, 123, 385/29; 359/156, 161, 192, 140

(56) References Cited

U.S. PATENT DOCUMENTS 5,311,346 A    5/1994  Haas et al.
5,930,414 A  * 7/1999  Fishman et al. ............... 385/11

OTHER PUBLICATIONS

A. Galtarossa, G. Gianello, C. G. Someda, "In–Field Comparison Among Polarization–Mode–Dispersion Measurement Techniques," Journal of Lightwave Technology, IEEE, vol. 14 (No. 1), p. 42–51, (Jan. 2, 1996).
N. Gisin, R. Passy, and J. P. Von der Weid, "Definitions and Measurements of Polarization Mode Dispersion: Interferometric Versus Fixed Analyzer Methods," IEEE Photonics Technology Letters, 6th ed., IEEE, vol. 6 (No. 6), p. 730–732, (Jun. 2, 1994).

N. Gisin, B. Gisin, J.P. Von der Weid, R. Passy, "How Accurately Can One Measure a Statistical Quantity Like Polarization–Mode Dispersion?," IEEE Photonics Technology Letters, IEEE, vol. 8 (No. 12), p. 1671–1673, (Dec. 2, 1996).
B. L. Heffner, "Automated Measurement of Polarization Mode Dispersion Using Jones Matrix Eigenanalysis," IEEE Photonics Technology Letters, IEEE, vol. 4 (No. 9), p. 1066–1069, (Sep. 2, 1992).
Fred Heismann, Daniel A. Fishman, and D. L. Wilson, "Automatic Compensation of First—Order Polarization Mode Dispersion in A 10 Gb/s Transmission System," Bell Labs, Lucent Technologies (Holmdel, NJ), (Sep. 2, 1998).
Y. Namihira and K. Nakajima, "Comparison of various polarisation mode dispersion measurement methods in 1600 km EDFA system," Electronics Letters, IEEE, p. 1157–1158 (May, 1994).

(List continued on next page.)

Primary Examiner—Cassandra Spyrou
Assistant Examiner—Fayez Assaf
(74) Attorney, Agent, or Firm—Harley R. Ball; Steven J. Funk; Kevin D. Robb

(57) ABSTRACT

A polarization scrambler and a polarization mode dispersion (PMD) compensation system compensate for PMD on an active optic fiber. The polarization scrambler scrambles a state of polarization of an optical signal that carries user information. The PMD compensation system then receives the optical signal over the active optic fiber. The PMD compensation system measuring a differential group delay and principal states of polarization of the PMD in the active optic fiber. The PMD compensation system then determines a modification of the optical signal based on the differential group delay and the principal states of polarization of the PMD. The PMD compensation system modifies the optical signal in the active optic fiber to compensate for PMD based on the determination of the modification. The PMD compensation system then transmits the optical signal. By measuring the differential group delay and the principal states of polarization, the PMD compensation system adapts to changes in the PMD in the active optic fiber.

29 Claims, 4 Drawing Sheets

OTHER PUBLICATIONS

Takahashi, T., T. Imai, and M. Aiki, "Automatic compensation technique for timewise fluctuating polarization mode dispersion in in–line amplifier systems," Electronics Letters, 30, pp. 348–349, 1994.

Xiaojun Fang, Liping Chen, Chao–Xiang Shi, "System for Reducing the Influence of Polarization Mode Dispersion in High–Speed Fiber Optic Transmission Channels" patent application No. 09/150,034 filed Sep. 9, 1998.

* cited by examiner

METHOD AND APPARATUS TO COMPENSATE FOR POLARIZATION MODE DISPERSION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a system that compensates for polarization mode dispersion in an optic fiber.

2. Description of the Prior Art

In fiber optic communication systems, a fiber that carries optical signals contains asymmetries. These asymmetries result in the optical properties of the fiber not being the same in all directions. Thus, the fiber is birefringent, where the material displays two different indices of refraction. This fiber birefringence causes polarization mode dispersion (PMD).

PMD is measured like a vector quantity, where a differential group delay is the magnitude of the vector and the principal state of polarization (PSP) are the direction. There are two PSPs associated with PMD. The two PSPs propagate at slightly different velocities with the distribution of signal power varying with time. PMD is a time varying stochastic effect. PMD varies in time with ambient temperature, fiber movement, and mechanical stress on the fibers. Compensating for PMD can be difficult because of the time varying nature and randomness of PMD.

Prior systems that involve taking the fiber out of operation to compensate for PMD are expensive. There have been few systems that have attempted to compensate for PMD on active fibers. A fiber is active when the fiber is operational to exchange user information. One prior system uses a polarization controller at the transmitter. The polarization controller aligns the input state of polarization of the input optical signal to the PSP of the fiber to reduce the signal distortion. One disadvantage of this system is the requirement of timely knowledge of the PSPs, which is difficult at best. Another disadvantage is the PSP of the fibers are different for each receiver. When optical add/drops are involved, this system is ineffective.

Another system uses a polarization controller prior to the receiver. The polarization controller aligns the polarization of one of the PSPs with a polarization filter. The polarization controller also receives control signals from a feedback arrangement. This system processes one of the PSPs which is essentially free from the PMD effects.

Another system uses a polarization controller and a length of polarization-maintaining fiber prior to the receiver. The length of the polarization-maintaining fiber is selected so a fixed value of differential group delay is equal to the average differential group delay of the long fiber to minimize the PMD effects. A disadvantage is this system only works for a fixed value of differential group delay. When differential group delay varies, the system does not fully compensate for the PMD effects.

Another system monitors the effect of PMD on an input optical signal. The power level of a non-return-to-zero (NRZ) optical signal's spectral component corresponding to one-half of the data rate indicates the PMD in a fiber link. In one example, to monitor the PMD on a 10 Gb/s NRZ optical signal, the system monitors the power of the spectral component at 5 GHz. This system comprises a narrowband filter centered at 5 GHz followed by a square-law detector and a lowpass filter.

One problem is that none of the prior systems track changes in the differential group delay, which is a component of PMD. Another problem is the degraded ability to monitor for DGD and PSPs when the input state of polarization of the input signal is nearly aligned with one of the PSPs. A system is needed that can compensate for PMD which accounts for changes in the PMD and the problems when the input state of polarization of the input signal is nearly aligned with one of the PSPs.

SUMMARY OF THE INVENTION

The invention solves the above problems by compensating for PMD. A polarization scrambler scrambles a state of polarization of an optical signal that carries user information. A PMD compensation system then receives the optical signal over an active optic fiber. The PMD compensation system then measures a differential group delay and principal states of polarization of the polarization mode dispersion in the active optic fiber. The PMD compensation system then determines a modification of the optical signal based on the differential group delay and the principal states of polarization of the polarization mode dispersion. The PMD compensation system modifies the optical signal in the active optic fiber to compensate for PMD based on the determination of the modification. The PMD compensation system then transmits the optical signal.

In various embodiments of the invention, the PMD compensation system measures the differential group delay and the principal states of polarization of the PMD in the active optic fiber by estimating the differential group delay and the principal states of polarization of the PMD in the active optic fiber. The PMD compensation system modifies the optical signal by changing the polarization state of the optical signal. The PMD compensation system modifies the optical signal by changing the differential group delay of the PMD in the active optic fiber.

Advantageously, the invention adapts to the time varying nature of the PMD in the active optic fiber by measuring the differential group delay and the principal states of polarization. Also, the invention is applied to active optic fibers so the fiber optic communication system does not have to be taken out of operation to compensate for PMD. The invention advantageously scrambles a state of polarization of the optical signal to greatly improve the measurement of the differential group delay and the principal states of polarization.

A particular reference number refers to the same element in all of the other figures.

DETAILED DESCRIPTION OF THE INVENTION

Figure 1:
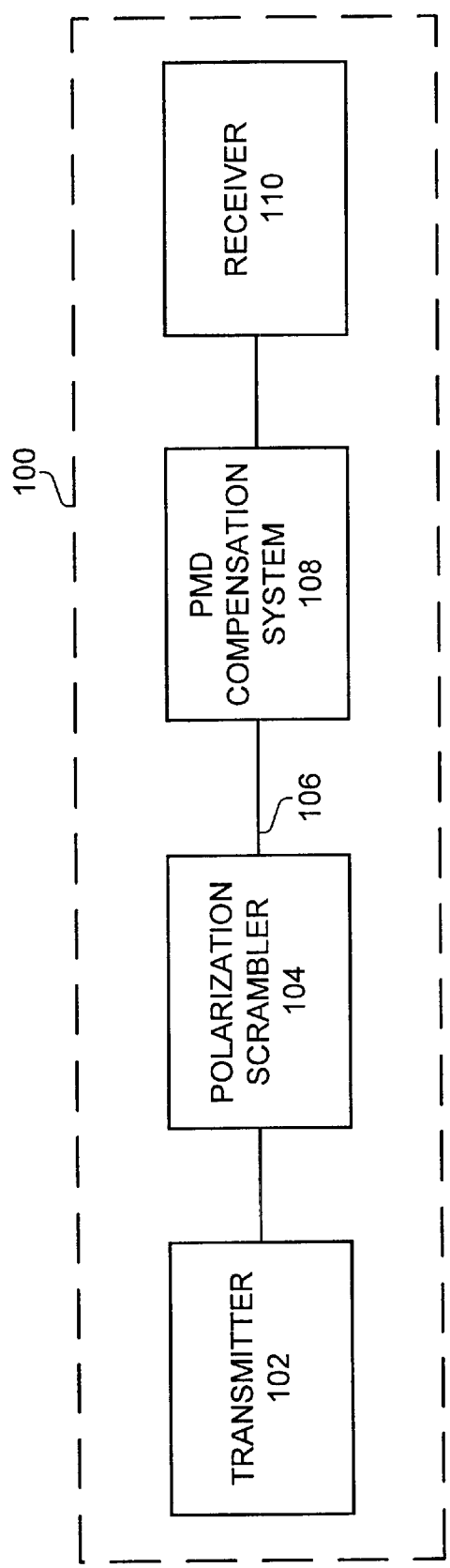
FIG. 1 is a system level block diagram of an example of the invention.

FIG. 1 depicts a system level block diagram of a fiber optic communication system 100 in an example of the invention. In FIG. 1, a transmitter 102 is connected to a polarization scrambler 104. The polarization scrambler 104 is connected to a PMD compensation system 108 via an active optic fiber 106. The PMD compensation system 108 is connected to a receiver 110.

The transmitter 102 could be any device configured to transmit optical signals. The transmitter 102 typically modulates the optical signals to carry user information. The receiver 110 could be any device configured to receive optical signals. The receiver 102 typically derives data from the optical signals.

The polarization scrambler 104 is any device or group of devices configured to scramble the state of polarization of the optical signal that carries user information. The PMD compensation system 108 is any device or group of devices configured to (1) receive the optical signal over the active optic fiber 106, (2) measure a differential group delay and principal states of polarization of the polarization mode dispersion in the active optic fiber 106, (3) determine a modification of the optical signal based on the differential group delay and the principal states of polarization of the polarization mode dispersion, (4) modify the optical signal in the active optic fiber 106 to compensate for polarization mode dispersion based on the determination of the modification, and (5) transmit the optical signal.

Figure 2:
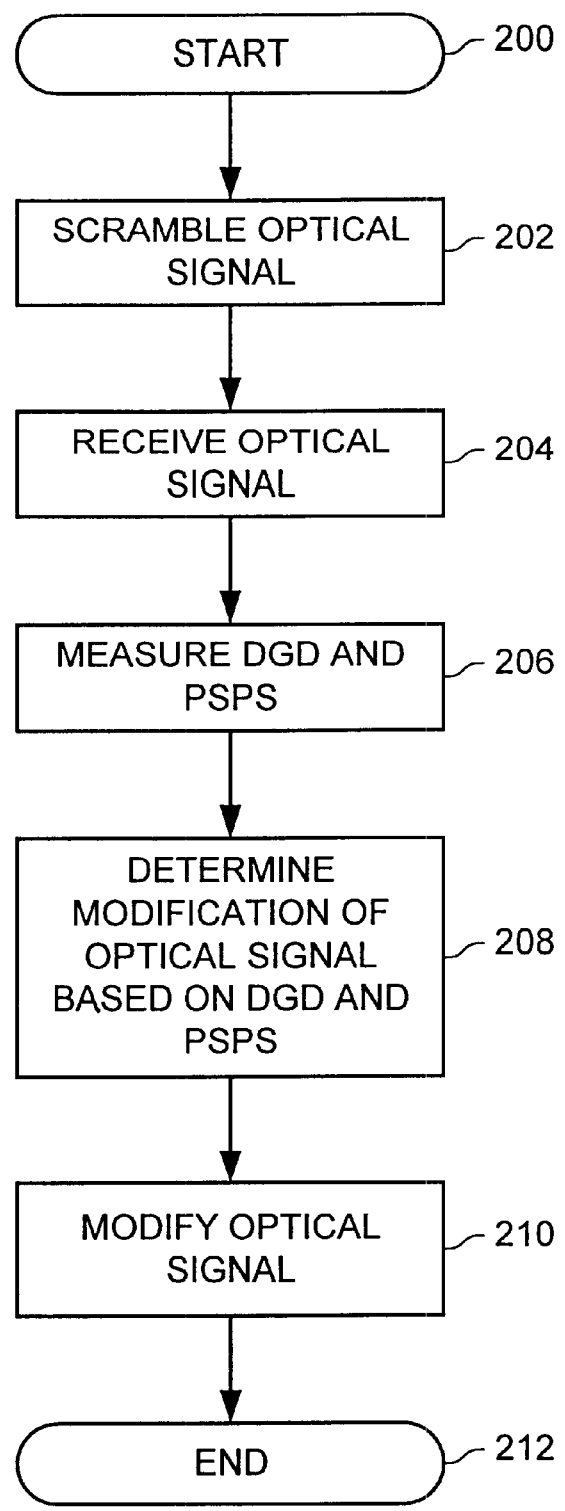
FIG. 2 a flow chart of the operation of a polarization scrambler and a PMD compensation system in an example of the invention.

In operation, the transmitter 102 transmits the optical signal to the polarization scrambler 104. FIG. 2 shows a flow chart of the operation of the polarization scrambler 104 and the PMD compensation system 108 in an example of the invention. FIG. 2 begins with step 200. In step 202, the polarization scrambler 104 scrambles a state of polarization of the optical signal. The PMD compensation system 108 then receives the optical signal over the active optic fiber 106 in step 204. In step 206, the PMD compensation system 108 measures a differential group delay and principal states of polarization of the PMD in the active optic fiber 106. In step 208, the PMD compensation system 108 then determines a modification of the optical signal based on the differential group delay and the principal states of polarization of the PMD. In step 210, the PMD compensation system 108 modifies the optical signal in the active optic fiber 106 based on the determination made in step 208 to compensate for PMD. The PMD compensation system 108 then transmits the optical signal. The operation of the PMD compensation system 108 ends in step 212. The receiver 110 receives the optical signal from the PMD compensation system 108.

Figure 3:
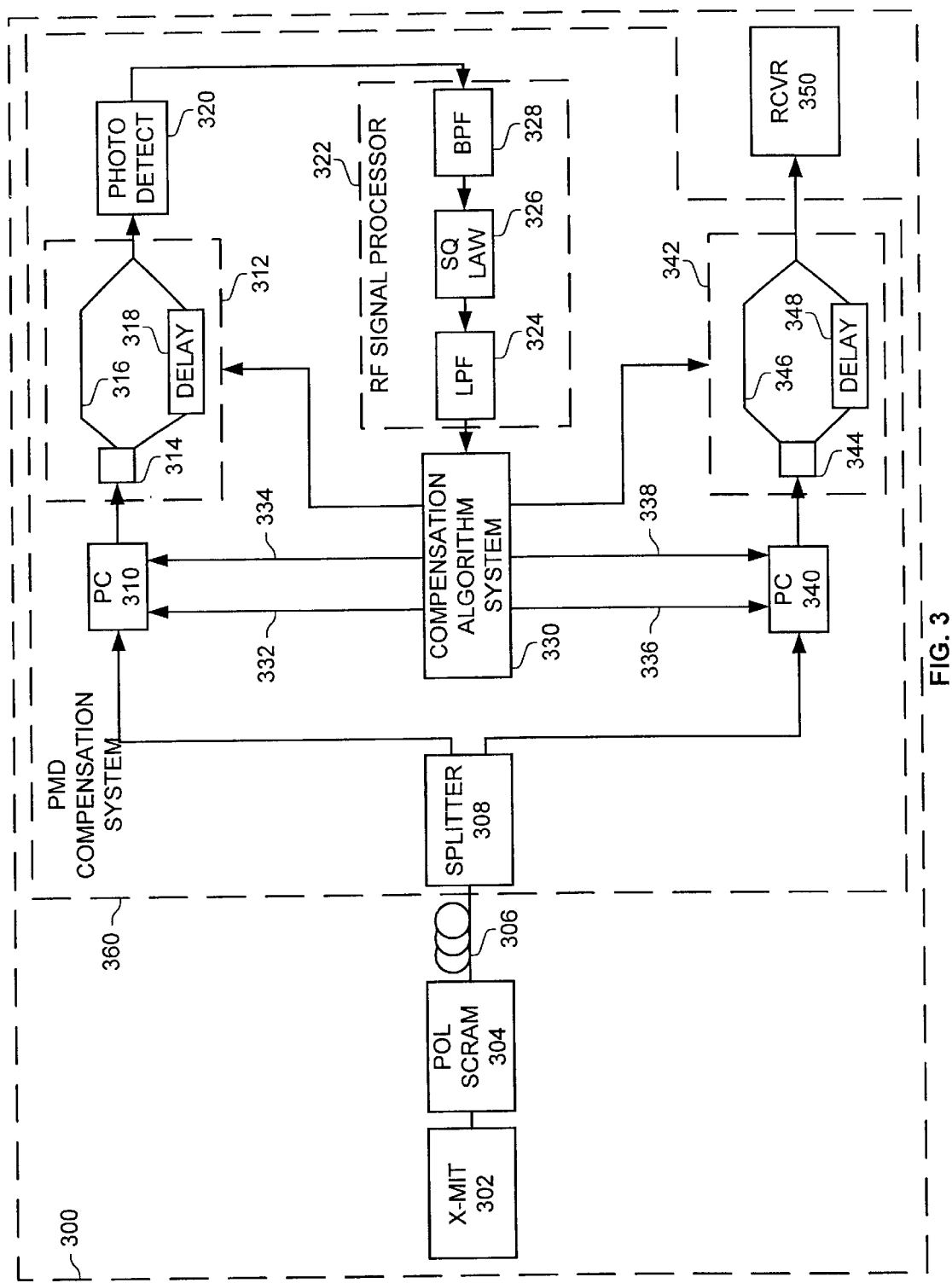
FIG. 3 is a system level diagram of a fiber optic communication system with a PMD compensation system including a feedback arrangement in an example of the invention.

FIG. 3 discloses one embodiment of the invention, but the invention is not restricted to the configuration provided below. Those skilled in the art will appreciate numerous variations in a fiber optic communication system configuration and operation that are within the scope of the invention. Those skilled in the art will also appreciate how the principles illustrated in this example can be used in other examples of the invention.

FIG. 3 depicts a system level diagram of a fiber optic communication system 300 with a PMD compensation system 360 including a feedback arrangement in an example of the invention. In FIG. 3, the PMD compensation system 360 comprises a splitter 308, a first polarization controller 310, a PMD emulator 312, a photodetector 320, a RF signal processor 322, a compensation algorithm system 330, a link 332, a link 334, a link 336, a link 338, a second polarization controller 340, and a PMD emulator 342. A transmitter 302 is connected to a polarization scrambler 304. The polarization scrambler 304 is connected to the splitter 308 via an active optic fiber 306. The splitter 308 is connected to the first polarization controller 310 and the second polarization controller 340.

The first polarization controller 310 is connected to the PMD emulator 312. The PMD emulator 312 comprises a splitter 314, a link 316, and a delay component 318. The first polarization controller 310 is connected to the splitter 314. The splitter 314 is coupled to the photodetector 320 via the link 316 and is coupled to the photodetector 320 via the delay component 318. The photodetector 320 is connected to the RF signal processor 322. The RF signal processor 322 comprises a lowpass filter 324, a square law detector 326, and a bandpass filter 328. The photodetector 320 is connected to the bandpass filter 328. The bandpass filter 328 is connected to the square law detector 326. The square law detector 326 is connected to the lowpass filter 324. The low pass filter 324 is connected to the compensation algorithm system 330. The compensation algorithm system 330 is coupled to the first polarization controller 310 via the links 332 and 334. The compensation algorithm system 330 is connected to the PMD emulator 312 and the PMD emulator 342. The compensation algorithm system 330 is coupled to the second polarization controller 310 via the links 336 and 338.

The second polarization controller 340 is connected to the PMD emulator 342. The PMD emulator 342 comprises a splitter 344, a link 346, and a delay component 348. The second polarization controller 340 is connected to the splitter 344. The splitter 344 is coupled to the receiver 350 via the link 346 and is coupled to the receiver 350 via the delay component 348.

A process path comprises the first polarization controller 310, the PMD emulator 312, the photodetector 320, the RF signal processor 322, and the compensation algorithm system 330. The components in the process path collectively measure the differential group delay and determine the modification of the optical signal based on the differential group delay. The data path comprises the second polarization controller 340 and the PMD emulator 342. The components in the data path collectively modify the optical signal based on the determination from the process path.

In operation, the transmitter 302 transmits the optical signal to the polarization scrambler 304. In some embodiments of the invention, the transmitter 302 includes a laser diode. The polarization scrambler 304 then scrambles the state of polarization of the optical signal that carries user information. Scrambling the state of polarization of the optical signal provides the greatest probability of having the power split between the two PSPs, while all of the power propagating along one of the PSP has the lowest probability. When the power is equally split between the two PSPs, the measurements of the DGD and PSPs are greatly improved. Thus, the polarization scrambler's 304 scrambling of the optical signal greatly improves the measurements of the DGD and PSPs. In one embodiment of the invention, the polarization scrambler's 304 rate of scrambling is greater than the response time of the low pass filter 324 to provide each sample of the low pass filter 324 multiple alignments of the optical signal.

The splitter 308 then receives the optical signal over the active optic fiber 306. In some embodiments of the invention, the active optic fiber 306 includes chromatic dispersion compensation systems, optical amplifiers, or multiple spans of optical fiber. Also, in other embodiments, the active optic fiber 306 carries wavelength division multiplexed (WDM) optical signals. The WDM optical signals are de-multiplexed prior to entering the splitter 308 in order for the operation of the PMD compensation system 360 to work properly. The PMD compensation system 360 may be required for each channel for a WDM signal.

The splitter 308 splits the optical signal. The splitter 308 transfers the optical signals to the first polarization controller 310 and the second polarization controller 340. The first polarization controller 310 receives the optical signal from the splitter 308. The first polarization controller 310 then changes the state of polarization of the optical signal based on signals received from the links 332 and 334. In one embodiment, the first polarization controller 310 aligns the active fiber link's 306 output principal state of polarization with the principal state of polarization of the PMD emulator 312. The first polarization controller 310 transfers the optical signal to the PMD emulator 312. The splitter 314 in the PMD emulator 312 receives the optical signal and splits the optical signal into two optical signals with orthogonal polarizations. The splitter 314 transmits one optical signal with the orthogonal polarization to the link 316. The splitter 314 also transmits the other optical signal with the orthogonal polarization to the delay component 318. The delay component 318 delays the optical signal with the orthogonal polarization based on signals received from the compensation algorithm system 330. The PMD emulator 312 recombines the two optical signals with orthogonal polarizations from the link 316 and the delay component 318 before transferring the optical signal to the photodetector 320.

The photodetector 320 receives the optical signal. The photodetector 320 converts the optical signal to an electrical signal before transferring the electrical signal to the RF signal processor 322. The bandpass filter 328 receives the electrical signal. The bandpass filter 328 is a narrow pass band centered at half the signal data rate. The bandpass filter 328 then transfers the electrical signal to the square-law detector 326. The square-law detector 326 processes the electrical signal and transfers the electrical signal to the lowpass filter 324. The lowpass filter 324 receives the electrical signal. The lowpass filter 324 converts the electrical signal to a control signal before transferring the control signal to the compensation algorithm system 330.

Figure 4:
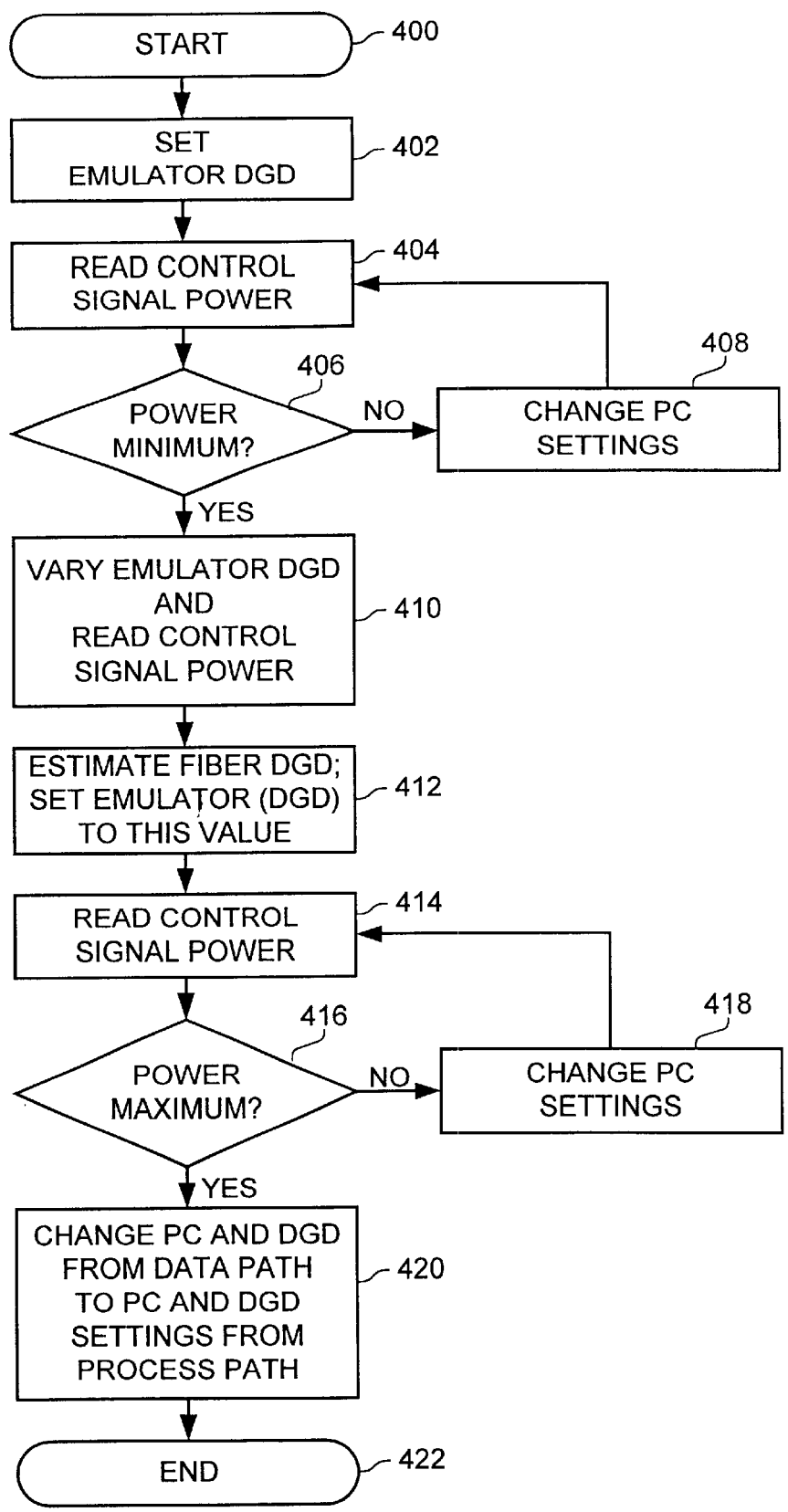
FIG. 4 is a flow chart of an operation of a compensation algorithm system in an example of the invention.

FIG. 4 is a flow chart of an operation of the compensation algorithm system 330 in an example of the invention. FIG. 4 begins in step 400. In step 402, the compensation algorithm system 330 sets the emulated differential group delay of the PMD emulator 312 to an arbitrary but fixed value. In this embodiment, the initial emulated differential group delay is 15 picoseconds. Also, the compensation algorithm system 330 sets the initial PMD emulator 342 differential group delay to 0 picoseconds. In step 404, the compensation algorithm system 330 reads the power of the control signal. In step 406, the compensation algorithm system 330 checks if the power at the control signal is at a minimum.

If the power at the control signal is not at a minimum, the compensation algorithm system 330 proceeds to step 408. In step 408, the compensation algorithm system 330 changes the first polarization controller 310 values via the link 332 and the link 334. The link 332 carries signals that control the θ value of the first polarization controller 310. The link 334 carries signals that control the φ value of the first polarization controller 310. Once the first polarization controller 310 values are changed, the compensation algorithm system 330 returns to step 404.

If the power at the control signal is at a minimum, the compensation algorithm system 330 proceeds to step 410. In step 410, the compensation algorithm system 330 varies the emulated differential group delay in the PMD emulator 312 and measures the power at the control signal. In step 312, the compensation algorithm system 330 determines the maximum power of the control signal based on the measurements from step 410. The compensation algorithm system 330 estimates the differential group delay of the active optic fiber 306 by using the differential group delay value at the maximum power of the control signal. The compensation algorithm system 330 then sets the emulated differential group delay value of the PMD emulator 312 with the estimated active optic fiber 306 differential group delay value.

In step 414, the compensation algorithm system 330 reads the power of the control signal. In step 416, the compensation algorithm system 330 checks if the power at the control signal is at a maximum. If the power at the control signal is not at a maximum, the compensation algorithm system 330 proceeds to step 418. In step 418, the compensation algorithm system 330 changes the first polarization controller 310 values via the link 332 and the link 334. Once the first polarization controller 310 values are changed, the compensation algorithm system 330 returns to step 414.

If the power at the control signal is at a maximum, the compensation algorithm system 330 proceeds to step 420. In step 420, the compensation algorithm system 330 changes the polarization controller values and the differential group delay value from the data path from the polarization controller values and the emulated differential group delay value from the process path. The link 336 carries signals that control the θ value of the second polarization controller 340. The link 338 carries signals that control the φ value of the second polarization controller 340. The compensation algorithm system 330 sets the θ value of the link 336 to the θ value of the link 332. The compensation algorithm system 330 sets the φ value of the link 338 to the φ value of the link 334. The compensation algorithm system 330 sets the differential group delay of the PMD emulator 342 to the emulated differential group delay of the PMD emulator 312. The operation of the compensation algorithm ends at step 422 and returns to step 400 to continually compensate for PMD.

The second polarization controller 340 receives the optical signal from the splitter 308. The second polarization controller 340 then changes the state of polarization of the optical signal based on signals received from the link 336 and the link 338. In one embodiment, the second polarization controller 340 aligns the active fiber link's 306 principal state of polarization with the principal state of polarization of the PMD emulator 342. The second polarization controller 340 transfers the optical signal to the PMD emulator 342. The splitter 344 in the PMD emulator 342 receives the optical signal and splits the optical signal into two optical signals with orthogonal polarizations. The splitter 344 transmits one optical signal with the orthogonal polarization to the link 346. The splitter 344 also transmits the other optical signal with the orthogonal polarization to the delay component 348. The delay component 348 delays the optical signal with the orthogonal polarization based on signals received from the compensation algorithm system 330. The PMD emulator 342 recombines the two optical signals with orthogonal polarizations from the link 346 and the delay component 348 into the optical signal to compensate for PMD. The PMD emulator 342 then transfers the optical signal to the receiver 350. The receiver 350 receives the optical signal to derive data from the optical signal. Those skilled in the art will appreciate variations of the above-described embodiments that fall within the scope of the invention. As a result, the invention is not limited to the specific examples and illustrations discussed above, but only by the following claims and their equivalents.

We claim:
1. A method for compensating for polarization mode dispersion on an active optic fiber, the method comprising:

receiving a first optical signal that carries user information;

scrambling a state of polarization of the first optical signal;

splitting the first optical signal into a second optical signal along a process path and a third optical signal;

in the process path, measuring a differential group delay and principal states of polarization of the polarization mode dispersion in the active optic fiber based on the second optical signal;

in the process path, determining a modification of the third optical signal based on the differential group delay and the principal states of polarization of the polarization mode dispersion;

modifying the third optical signal in the active optic fiber wherein the third optical signal is polarization mode dispersion compensated and carries user information based on the determination; and transmitting the third optical signal.
2. The method of claim 1 wherein the optical signal is a wavelength division multiplexed optical signal.
3. The method of claim 2 further comprising de-multiplexing the wavelength division multiplexed optical signal.
4. The method of claim 1 further comprising changing the state of polarization of the third optical signal.
5. The method of claim 1 further comprising delaying the third optical signal.
6. The method of claim 1 further comprising converting the second optical signal to an electrical signal.
7. The method of claim 6, further comprising filtering the electrical signal with a bandpass filter.
8. The method of claim 6, further comprising processing the electrical signal through a square-law detector.
9. The method of claim 6, further comprising filtering the electrical signal with a low pass filter.
10. The method of claim 9 wherein scrambling a state of polarization of the optical signal is at a rate greater than a response time of the low pass filter.
11. The method of claim 1 wherein measuring the differential group delay of the polarization mode dispersion in the active optic fiber comprises estimating the differential group delay of the polarization mode dispersion in the active optic fiber.
12. The method of claim 1 wherein modifying the third optical signal in the active optic fiber based on the determination comprises changing the state of polarization of the third optical signal.
13. The method of claim 1 wherein modifying the third optical signal in the active optic fiber-based on the determination comprises changing the differential group delay of the polarization mode dispersion in the active optic fiber.
14. A system for compensating for polarization mode dispersion on an active optic fiber, the system comprising:

a polarization mode dispersion compensation system coupled to the active optic fiber and configured to receive a first optical signal that carries user information, scramble a state of polarization of the first optical signal, split the first optical signal into a second optical signal along a process path and a third optical signal, in the process path, measure a differential group delay and principal states of polarization of the polarization mode dispersion in the active optic fiber based on the second optical signal, determine a modification of the third optical signal based on the differential group delay and the principal states of polarization of the polarization mode dispersion, modify the third optical signal in the active optic fiber wherein the third optical signal is polarization mode dispersion compensated and carries user information based on the determination, and transmit the third optical signal.
15. The system of claim 14 wherein the optical signal is a wavelength division multiplexed optical signal.
16. The system of claim 15 wherein the polarization mode dispersion compensation system is configured to de-multiplex the wavelength division multiplexed optical signal.
17. The system of claim 14 wherein the polarization mode dispersion compensation system comprises a splitter coupled to the active optic fiber and configured to split the first optical signal into the second optical signal along the process path and the third optical signal.
18. The system of claim 14 wherein the polarization mode dispersion compensation system comprises a polarization controller configured to change the state of polarization of the third optical signal.
19. The system of claim 14 wherein the polarization mode dispersion compensation system comprises a polarization mode dispersion emulator configured to delay the third optical signal.
20. The system of claim 19 wherein the polarization mode dispersion emulator comprises a splitter configured to split the third optical signal into two optical signals with orthogonal polarizations.
21. The system of claim 19 wherein the polarization mode dispersion emulator comprises a delay component configured to delay the third optical signal.
22. The system of claim 14 wherein the polarization mode dispersion emulator comprises a photodetector configured to convert the second optical signal to an electrical signal.
23. The system of claim 22 wherein the polarization mode dispersion emulator comprises a radio frequency signal processor configured to process the electrical signal.
24. The system of claim 22 wherein the radio frequency signal processor comprises a bandpass filter configured to filter the electrical signal.
25. The system of claim 22 wherein the radio frequency signal processor comprises a square-law detector configured to process the electrical signal.
26. The system of claim 22 wherein the radio frequency signal processor comprises a low pass filter configured to filter the electrical signal.
27. The system of claim 26 wherein the rate of the polarization mode dispersion compensation system scrambling the state of polarization of the optical signal is at a rate greater than a response time of the low pass filter.
28. The system of claim 14 wherein the polarization mode dispersion compensation system is configured to estimate the differential group delay of the polarization mode dispersion in the active optic fiber.
29. The system of claim 14 wherein the polarization mode dispersion compensation system is configured to change the differential group delay of the polarization mode dispersion in the active optic fiber.

* * * * *